(12) United States Patent
Handa

(10) Patent No.: US 8,862,418 B2
(45) Date of Patent: Oct. 14, 2014

(54) MAGNETIC DATA PROCESSING DEVICE, MAGNETIC DATA PROCESSING METHOD, AND MAGNETIC DATA PROCESSING PROGRAM

(75) Inventor: Ibuki Handa, Iwata (JP)

(73) Assignee: Yamaha Corporation, Hamamatsu-Shi, Shizuoka-Ken (JP)

( * ) Notice: Subject to any disclaimer, the term of this patent is extended or adjusted under 35 U.S.C. 154(b) by 1079 days.

(21) Appl. No.: 12/342,964

(22) Filed: Dec. 23, 2008

(65) Prior Publication Data
US 2009/0171608 A1      Jul. 2, 2009

(30) Foreign Application Priority Data
Dec. 28, 2007   (JP) .................................. 2007-339478

(51) Int. Cl.
G01C 17/00      (2006.01)
G01C 17/28      (2006.01)

(52) U.S. Cl.
CPC ....................................... G01C 17/28 (2013.01)
USPC ........................................................ 702/92

(58) Field of Classification Search
USPC ........................................................ 702/92
See application file for complete search history.

(56) References Cited

U.S. PATENT DOCUMENTS
2007/0213950 A1      9/2007  Handa

FOREIGN PATENT DOCUMENTS
JP          2007-240270        *    9/2007  .............. G01R 33/02

OTHER PUBLICATIONS http://www.merriam-webster.com/dictionary/optimize, p. 1, Aug. 2, 2010.*
http://www.merriam-webster.com/dictionary/acceleration, p. 1, Aug. 2, 2010.*

* cited by examiner

*Primary Examiner* — Tung S Lau
(74) *Attorney, Agent, or Firm* — Dickstein Shapiro LLP

(57) ABSTRACT

In a magnetic data processing device, a magnetic data input part sequentially receives magnetic data output from a three-dimensional (3D) magnetic sensor. A storage part stores a plurality of the magnetic data as a data set of statistical population. An acceleration data input part receives acceleration data output from a 3D acceleration sensor. A reliability determination part derives a reliability index that is a function of an angular difference between a direction of a line perpendicular to an approximate plane representing a distribution of the data set of the statistical population and a direction of acceleration represented by the acceleration data.

10 Claims, 5 Drawing Sheets

MAGNETIC DATA PROCESSING DEVICE, MAGNETIC DATA PROCESSING METHOD, AND MAGNETIC DATA PROCESSING PROGRAM

BACKGROUND OF THE INVENTION

1. Technical Field of the Invention

The present invention relates to a magnetic data processing device, a magnetic data processing method and a magnetic data processing program, and more particularly to a technology for determining the reliability of magnetic data.

2. Description of the Related Art

Conventionally, a magnetic sensor has been used to measure orientation or the like. When magnetism is measured using a magnetic sensor, the output of the magnetic sensor includes not only components of a measurement target such as Earth's magnetism (geomagnetism) but also noise or offset components. For example, in the case where Earth's magnetism is measured by a magnetic sensor in a Personal Navigation Device (PND) mounted in a transportation device such as a vehicle, the offset component is caused by magnetization of the transportation device or the PND itself, or is caused by temperature characteristics of the magnetic sensor. The offset component varies as operating environments such as magnetization of the vehicle or temperature vary. Therefore, the output of the magnetic sensor is corrected by subtracting an offset component derived based on the output of the magnetic sensor from the output of the magnetic sensor (for example, see Patent Reference 1).

[Patent Reference 1] Japanese Patent Application Publication No. 2007-240270

However, in the case where Earth's magnetism is measured by a magnetic sensor in a PND mounted in a transportation device, the offset component is caused by a magnetic field generated by an electronic circuit mounted in the transportation device or the PND or is caused by a magnetic field that the transportation device receives when traveling near a strong magnetic field source such as a grade crossing. Accordingly, it is difficult to perform the correction for perfectly negating the noise component. Therefore, in a system using such a magnetic sensor, an error is included in data derived from the output of the magnetic sensor. However, when the output of the magnetic sensor contains a great error or when an error in one magnetic data element is amplified by an error in another magnetic data element, the reliability of the system is significantly hampered. Thus, it is important to determine the reliability of magnetic data output from the magnetic sensor.

SUMMARY OF THE INVENTION

It is an object of the invention to enable use of magnetic data whose reliability has been guaranteed.

A magnetic data processing device for achieving the above object includes a magnetic data input part for sequentially receiving magnetic data output from a three-dimensional (3D) magnetic sensor, a storage part for storing a plurality of the magnetic data as a data set of statistical population, an acceleration data input part for receiving acceleration data output from a 3D acceleration sensor, and a reliability determination part for deriving a reliability index that is a function of an angular difference between a direction of a line perpendicular to an approximate plane representing a distribution of the data set of statistical population and a direction of acceleration represented by the acceleration data.

In the case where a 3D magnetic sensor is attached to a moving object such as a land or marine transportation device which moves on a substantially horizontal plane, the moving object rotates about a nearly vertical axis and therefore an output of the 3D magnetic sensor, which measures Earth's magnetism while the moving object rotates, is distributed over a planar range in a 3D coordinate system. Accordingly, the direction of a line perpendicular to an approximate plane representing a distribution of a data set of statistical population including a plurality of magnetic data output from the 3D magnetic sensor is almost parallel to the vertical axis.

On the other hand, acceleration data output from an acceleration sensor attached to a moving object that is stationary or is in linear and uniform motion represents gravitational acceleration. Accordingly, in the case where a moving object rotates in a horizontal plane while an acceleration component corresponding to the centrifugal force is within a range sufficiently small relative to gravitational acceleration, the direction of a line perpendicular to an approximate plane representing a distribution of a data set of statistical population including a plurality of magnetic data output from the 3D magnetic sensor is nearly parallel to the direction of acceleration represented by the acceleration data.

In addition, in the case where magnetic data contains a great error, the angular difference between the direction of the gravitational acceleration and the direction of the line perpendicular to the approximate plane representing the distribution of the data set of statistical population including a plurality of magnetic data output from the 3D magnetic sensor and the direction of acceleration represented by the acceleration data is great. That is, the angular difference between the direction of the gravitational acceleration and the direction of the line perpendicular to the approximate plane representing the distribution of the data set of statistical population including a plurality of magnetic data output from the 3D magnetic sensor represents the reliability of magnetic data as data representing Earth's magnetism. Therefore, in the invention, a reliability index which is a function of the angular difference between the direction of the gravitational acceleration and the direction of the line perpendicular to the approximate plane representing the distribution of the data set of statistical population including a plurality of magnetic data output from the 3D magnetic sensor is derived as an index representing the reliability of the magnetic data. Thus, according to the invention, it is possible to determine the reliability of magnetic data as data representing Earth's magnetism.

The direction of acceleration may be derived from acceleration data. For example, an indicator vector may be derived using a plurality of the acceleration data, and the reliability index, which is a function of the angular difference between the direction of the line perpendicular to the approximate plane representing the distribution of the data set of statistical population and the direction of the acceleration, may be derived using the direction of the indicator vector as the direction of the acceleration. The indicator vector is obtained by weighting the plurality of the acceleration data and summing the plurality of the weighted acceleration data.

Generally, the difference between the gravitational acceleration and dynamic acceleration at a certain moment may be great since the moving object such as a vehicle is moving while accelerating various directions. If a plurality of acceleration data is used, it is possible to cancel variation of acceleration from which a gravitational acceleration component of the moving object has been subtracted through averaging or smoothing and to derive an indicator vector close to the gravitational acceleration. Deriving the reliability index using such an indicator vector increases the accuracy of determination of the reliability of magnetic data.

The reliability index may be a function of the angular difference between the direction of acceleration represented by the acceleration data and the direction of the line perpendicular to the approximate plane representing the data set of statistical population. For example, a function of an inner product of the indicator vector and an eigenvector corresponding to a minimum eigenvalue of a variance-covariance matrix of the data set of statistical population may be derived as the reliability index.

There can be considered a variety of methods of using the reliability index derived according to the invention. For example, a reliability index may be used when one magnetic data element included in a data set of statistical population is used as data representing the direction of an object. More importantly, the derivation of an offset of magnetic data based on the data set of statistical population whose reliability has been guaranteed by the reliability index is very practical. As described above, the offset of magnetic data varies as operating environments such as magnetization of the vehicle or temperature vary and is used for an offset correction process which subtracts an offset component caused by such offset factors from magnetic data. In the case where a great error is included in such an offset, all offset-corrected magnetic data will contain a great error. Accordingly, deriving an offset of magnetic data based on a data set of statistical population, the reliability of which has been determined to be acceptable, is very important. Therefore, it is preferable that the magnetic data processing device further includes an offset derivation part for deriving an offset of the magnetic data by using the data set of statistical population according to the reliability index. In one form, the offset derivation part derives the offset of the magnetic data by using the data set of the statistical population only when the reliability index indicates that the data set is acceptable, while the offset derivation part does not use the data set of the statistical population when the reliability index indicates that the data set is unacceptable. In another form, the offset derivation part derives the offset of the magnetic data by using the data set of the statistical population while weighting the data set by a value of the reliability index.

The magnetic data processing device of the invention may be constructed with or without a 3D magnetic sensor and a 3D acceleration sensor.

The invention also provides a navigation apparatus including a magnetic data processing device, a correction part for correcting the magnetic data based on the offset, and an orientation notification part for providing notification of an orientation based on the corrected magnetic data.

The invention also provides a magnetic data processing method including the steps of sequentially receiving magnetic data output from a 3D magnetic sensor, storing a plurality of the magnetic data as a data set of statistical population, receiving acceleration data output from a 3D acceleration sensor, and deriving a reliability index that is a function of an angular difference between a direction of a line perpendicular to an approximate plane representing a distribution of the data set of statistical population and a direction of acceleration represented by the acceleration data.

The invention also provides a machine readable medium containing a magnetic data processing program causing a computer to perform a process comprising: sequentially receiving magnetic data output from a 3D magnetic sensor; storing a plurality of the magnetic data as a data set of statistical population; receiving acceleration data output from a 3D acceleration sensor; and deriving a reliability index that is a function of an angular difference between a direction of a line perpendicular to an approximate plane representing a distribution of the data set of the statistical population and a direction of acceleration represented by the acceleration data.

The order of the operations described above is not limited to that described unless there is a technical problem, and the operations may be performed at the same time or may be performed in a reversed order and need not be performed in the sequential order. The functions of each part described above are implemented by hardware resources whose functions are specified by the configuration itself, hardware resources whose functions are specified by a program, or a combination thereof. The functions of each part are not limited to those implemented by physically independent hardware resources. The invention also provides a recording medium containing the magnetic data processing program. Of course, the recording medium containing the magnetic data processing program may be a magnetic recording medium or a magneto-optical recording medium and may be any other recording medium developed in the future.

DETAILED DESCRIPTION OF THE INVENTION

The embodiments of the invention will now be described in detail with reference to the accompanying drawings.

1. Principle for Deriving Direction of Vertical Axis from Magnetic Data
2. Hardware Structure
3. Software Structure
4. Magnetic Data Processing Flow
5. Other Embodiments 1. Principle for Deriving Direction of Vertical Axis from Magnetic Data A land or marine transportation device such as an automobile moves on a substantially horizontal plane. When an automobile turns, a 3D magnetic sensor attached to the automobile rotates about a nearly vertical axis together with the automobile. Although the rotation axis of the 3D magnetic sensor deviates from the vertical axis when the automobile travels on a slope, an error in a reliability index caused by the deviation may be ignored in this embodiment.

Figure 1:
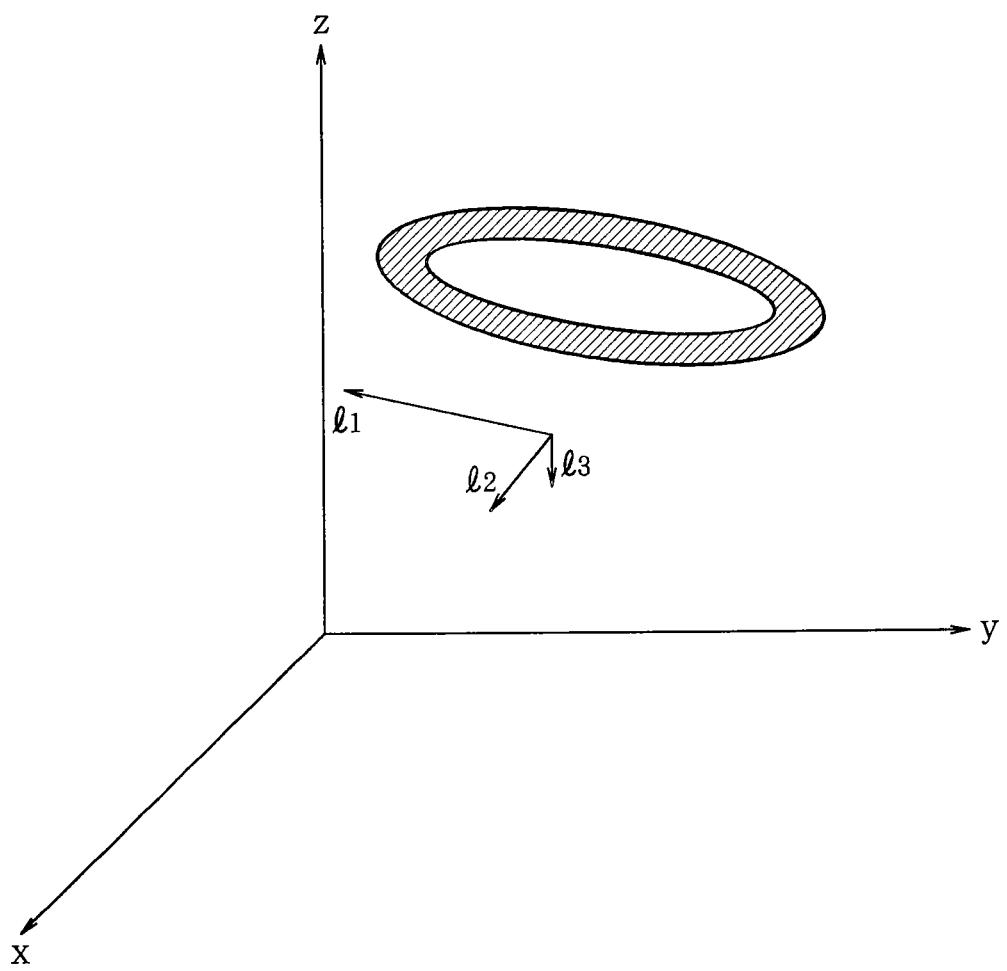
FIG. 1 is a vector diagram illustrating an embodiment of the invention.

If a plurality of magnetic data that are sequentially output from a 3D magnetic sensor at discrete times while an automobile turns 360 degrees are plotted on a coordinate system fixed to the magnetic sensor, the plurality of magnetic data are distributed over a donut-shaped region as hatched in FIG. 1. As described above, variation of the rotation axis of the automobile is small since the automobile moves in a nearly horizontal plane. Accordingly, the distribution of 3D magnetic data becomes thin and can be approximated as a plane. A vertical axis in a coordinate system fixed to the 3D magnetic sensor nearly coincides with a line perpendicular to the approximate plane. Accordingly, when the automobile is rotating, the direction of the vertical axis in the coordinate system fixed to the magnetic sensor can be derived based on the magnetic data. In this embodiment, the direction of the line perpendicular to the approximate plane of the distribution can be derived using eigenvalues of the distribution of the magnetic data.

2. Hardware Structure

Figure 2:
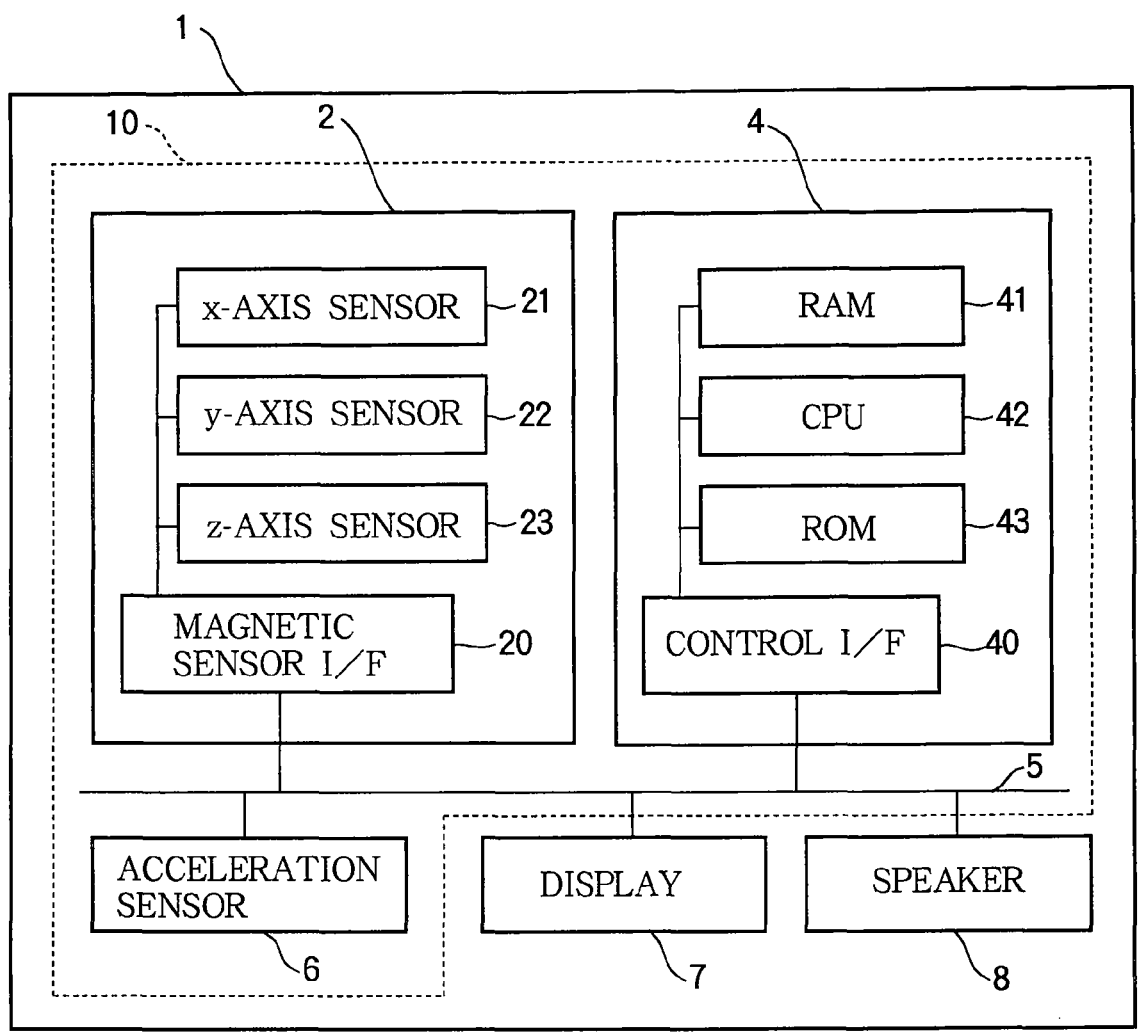
FIG. 2 is a block diagram illustrating the embodiment of the invention.

FIG. 2 is a block diagram illustrating an embodiment of a navigation apparatus according to the invention. The navigation apparatus 1 acquires the magnitudes of magnetic fields of 3 orthogonal (x, y, z) directions to detect the direction of the Earth's magnetism and notifies a user of the detected direction of the Earth's magnetism. The navigation apparatus 1 is a PND mounted in a vehicle such as an automobile.

The magnetic data processing device 10 includes a magnetic sensor 2, an acceleration sensor 6, and a controller 4. The controller 4 receives magnetic data from the magnetic sensor 2 and notifies the driver of a travel direction or an expected travel route determined based on offset-corrected magnetic data using image information or voice information. An image indicating the travel direction or the expected travel route is displayed on a display 7 that is controlled by the controller 4. A sound indicating the travel direction or the expected travel route is output from a speaker 8 that is controlled by the controller 4.

The magnetic sensor 2 is a 3D magnetic sensor including an x-axis sensor 21, a y-axis sensor 22, and a z-axis sensor 23 that detect x-direction, y-direction, and z-direction components of a magnetic vector. The x-axis sensor 21, the y-axis sensor 22, and the z-axis sensor 23 each include a magnetic resistance element, a hall element, or the like and may each be any type of directional 1D magnetic sensor. The x-axis sensor 21, the y-axis sensor 22, and the z-axis sensor 23 are fixed such that sensitivity directions thereof are orthogonal to each other. Outputs of the x-axis sensor 21, the y-axis sensor 22, and the z-axis sensor 23 are input in a time division manner to a magnetic sensor interface 20. The magnetic sensor interface 20 amplifies signals received from the x-axis sensor 21, the y-axis sensor 22, and the z-axis sensor 23 and then performs analog to digital conversion on the amplified signals. Digital magnetic data output from the magnetic sensor interface 20 is input to the controller 4 through a bus 5.

The acceleration sensor 6 is a 3D acceleration sensor that outputs acceleration data $g_i=(g_{ix}, g_{iy}, g_{iz})$ (i=1, 2, ...) indicating acceleration that is a combination of static acceleration in a direction parallel to gravitation force and dynamic acceleration unique to the movement of the acceleration sensor. The coordinate axis of the acceleration sensor 6 is coincident with the coordinate axis of the magnetic sensor 2. The acceleration sensor 6 may be constructed using any of a variety of types such as a capacitance type, a piezoelectric type, a strain gauge type, or a thermal detection type. Digital acceleration data output from the acceleration sensor 6 is input to the controller 4 through the bus 5. Since a direction associated with the acceleration data output from the acceleration sensor 6 that is motionless indicates the direction of the vertical axis, the output of the acceleration sensor 6 can be used as data indicating the direction of the vertical axis.

The controller 4 is a computer that includes a CPU 42, a ROM 43, a RAM 41, and a control interface 40. The CPU 42 is a processor that is responsible for overall control of the navigation apparatus 1. The controller 4 transmits and receives data to and from peripheral devices such as the magnetic sensor 2 and the acceleration sensor 6 through the control interface 40. The ROM 43 is a nonvolatile and machine-readable storage medium that stores a magnetic data processing program executed by the CPU 42 and a variety of programs for implementing functions of the navigation apparatus. The RAM 41 is a volatile storage medium that temporarily stores data to be processed by the CPU 42. The controller 4 and the magnetic sensor 2 may be constructed as a one-chip magnetic data processing device, or alternatively the controller 4, the magnetic sensor 2, and the acceleration sensor 6 may be constructed as a one-chip magnetic data processing device.

3. Software Structure

Figure 3:
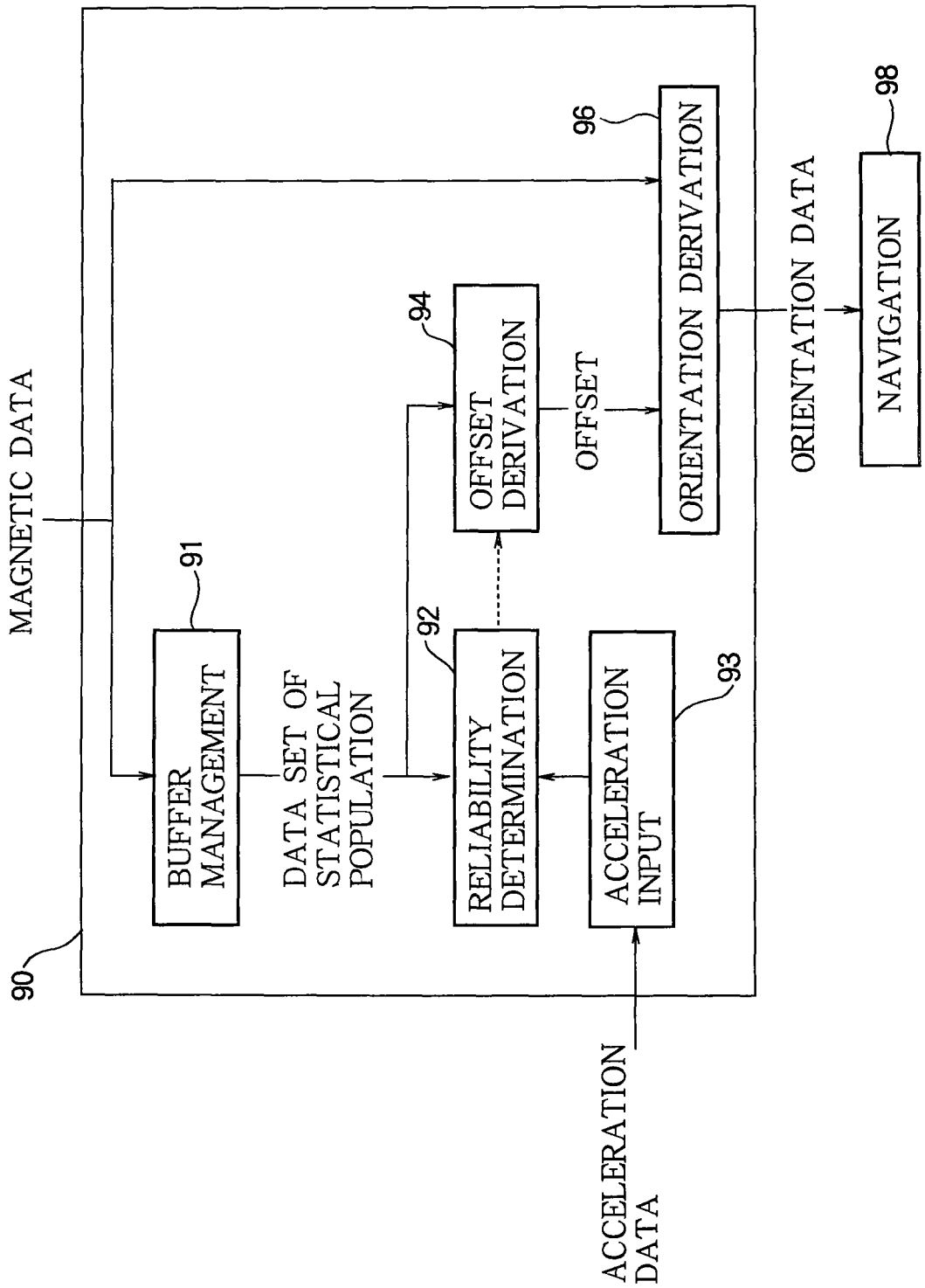
FIG. 3 is a block diagram illustrating the embodiment of the invention.

FIG. 3 is a block diagram illustrating a configuration of a magnetic data processing program 90. The magnetic data processing program 90 is a program for outputting orientation data to a navigation program 98 and is stored in the ROM 43. The orientation data is vector data indicating the direction of Earth's magnetism (i.e., Earth's magnetic field). The magnetic data processing program 90 includes a group of modules such as a buffer management module 91, a reliability determination module 92, an acceleration input module 93, an offset derivation module 94, and an orientation derivation module 96.

The buffer management module 91 is a program module for sequentially receiving magnetic data, which is sequentially output from the magnetic sensor 2, at specific time intervals, and storing the received magnetic data in a buffer in order to use the received magnetic data for updating the offset. Thus, the buffer management module 91 causes the controller 4 to function as both a magnetic data input part and a storage part. A set of magnetic data stored in the RAM 41 as a buffer is a data set of statistical population.

The acceleration input module 93 is a program module for sequentially receiving acceleration data, which is sequentially output from the acceleration sensor 6, at specific time intervals.

The reliability determination module 92 is a program module for deriving a reliability index which is a function of an angular difference between the direction of a line perpendicular to an approximate plane representing the distribution of the data set of statistical population stored in the buffer management module 91 and the direction of acceleration represented by the acceleration data received from the acceleration input module 93, and comparing the reliability index with a threshold to determine whether or not the reliability of the data set of statistical population is acceptable. Thus, the reliability determination module 92 causes the controller 4 to function as a reliability determination part.

The offset derivation module 94 is a program module for deriving a new offset based on the data set of statistical population, the reliability of which has been determined to be acceptable by the reliability determination module 92, and updating an old offset with the new offset. Thus, the offset derivation module 94 causes the controller 4 to function as an offset derivation part. When the old offset is updated with the new offset, the new offset becomes an old offset. Therefore, the old offset is simply referred to as an "offset" in contexts not causing misunderstanding. Actually, the offset used for orientation data correction is set as one variable and the new offset is derived as a different variable and the different variable is set as the variable used for orientation data correction when the new offset is derived.

The orientation derivation module 96 is a program module for correcting magnetic data sequentially received by the buffer management module 91 using the offset stored in the offset derivation module 94 to generate orientation data. Thus, the orientation derivation module 96 causes the controller 4 to function as a correction part. Specifically, the orientation derivation module 96 subtracts components of the offset from components of magnetic data which is vector data and outputs the vector data, from which the offset has been subtracted, as orientation data.

The navigation program 98 is a well-known program for notifying the driver of the direction of turning at an expected intersection for turning based on current location information, map information, and a current travel orientation represented by the orientation data. Thus, the navigation program 98 causes the controller 4 to function as an orientation notification part. The orientation data may be used only to notify the driver of the north, south, east and west travel directions through text, an arrow, or voice and may also be used to perform a heading-up process on a map displayed on the display 7.

4. Magnetic Data Processing Flow

Figure 4:
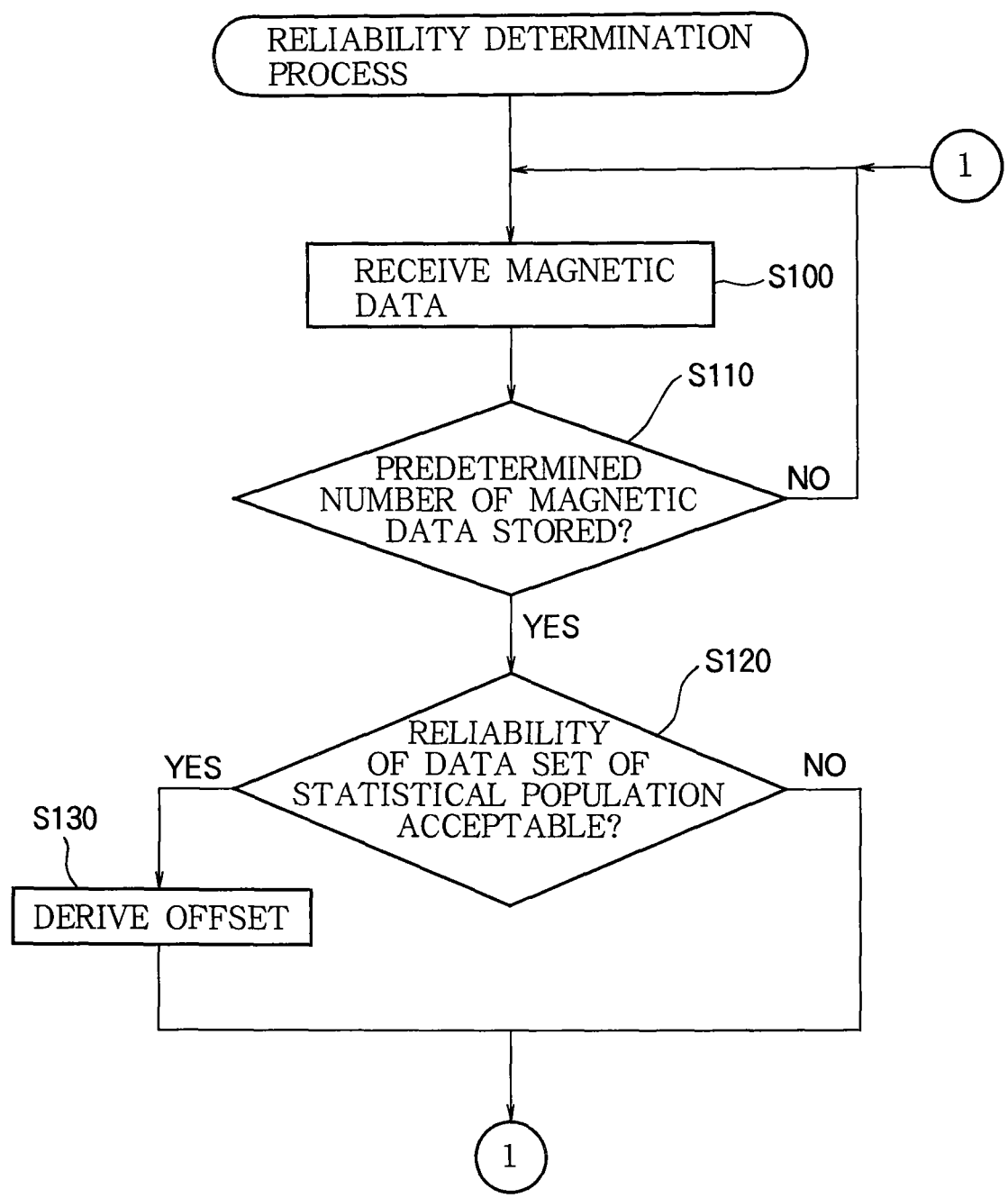
FIG. 4 is a flow chart illustrating the embodiment of the invention.

FIG. 4 is a flow chart illustrating a process for deriving an offset. The process illustrated in FIG. 4 is performed as the CPU 42 executes the magnetic data processing program 90 when an offset update request has been issued. The offset update request may be issued at regular time intervals or may be issued in response to an explicit instruction from the driver.

First, at step S100, the buffer management module 91 receives and stores magnetic data in a buffer. If the buffer management module 91 sequentially receives magnetic data from the magnetic sensor 2 at short time intervals when the travel direction of the automobile changes little, the distance between two consecutively received magnetic data is small. Storing a plurality of magnetic data at a small distance from each other in a buffer with a limited capacity wastes memory resources and causes unnecessary buffer update processes. In addition, if a new offset is derived based on a set of magnetic data at a small distance therebetween, there is a possibility that a new offset with low accuracy may be derived based on a data set of statistical population having a biased distribution. Therefore, the need to update the buffer may be determined in the following manner. For example, if the distance between magnetic data most recently stored in the buffer and last received magnetic data is smaller than a threshold, it is determined that there is no need to update the buffer and the last received magnetic data is discarded without being stored in the buffer.

Then, at step S110, the buffer management module 91 determines whether or not a predetermined number of magnetic data required to derive a new offset have been stored in the buffer. That is, the number of elements of the data set of statistical population has been predetermined. The processes of steps S100 and S110 are repeated until the predetermined number of magnetic data are stored in the buffer.

When the predetermined number of magnetic data have been stored in the buffer, the reliability determination module 92 determines whether or not the reliability of the data set of statistical population is acceptable (step S120). Specifically, the reliability determination module 92 derives a reliability index based on both the data set of statistical population and acceleration data, and determines whether or not the reliability of the data set of statistical population is acceptable based on the reliability index and a predetermined threshold p.

At step S120, first, the reliability determination module 92 derives a vector parallel to a line perpendicular to an approximate plane representing a distribution of the data set of statistical population where each magnetic data is expressed by the following Equation (1).

$$q_i = (q_{ix}, q_{iy}, q_{iz}) \ (i=1, 2, \ldots) \quad (1)$$

The distribution of the data set of statistical population expressed by Equation (1) can be expressed using, as indicators, eigenvalues of a symmetric matrix A that is defined as in Equations (2), (3), and (4) using the sum of vectors, each of which starts with the center of the data set of statistical population and ends with corresponding magnetic data.

$$A = X^T X \ldots \quad (2)$$

where $$X = \begin{bmatrix} (q_1 - \bar{q})^T \\ (q_2 - \bar{q})^T \\ (q_3 - \bar{q})^T \\ \ldots \\ (q_N - \bar{q})^T \end{bmatrix} \quad (3)$$

$$\bar{q} = \frac{1}{N} \sum_{i=1}^{N} q_i \quad (4)$$

The matrix A is N times a variance-covariance matrix since the matrix A can be written as Equation (5).

$$A = \sum_{i=1}^{N} (q_i - \bar{q})(q_i - \bar{q})^T \quad (5)$$

Eigenvalues of the matrix A are $\lambda_1, \lambda_2,$ and $\lambda_3$ in decreasing order. Let $l_1, l_2,$ and $l_3$ be eigenvectors, corresponding to $\lambda_1, \lambda_2,$ and $\lambda_3$, which have been normalized to 1 and are orthogonal to each other. Then, the direction of the eigenvector $l_3$ corresponding to the minimum eigenvalue $\lambda_3$ is parallel to a line perpendicular to a plane including most of the donut-shaped distribution of the data set of statistical population illustrated in FIG. 1, i.e., an approximate plane representing the distribution of the data set of statistical population. Accordingly, at step 120, the reliability determination module 92 derives the eigenvector 13.

Then, the reliability determination module 92 derives, as a reliability index, the angular difference between the direction of the eigenvector 13 and the direction of acceleration represented by the acceleration data. Here, in order to increase the accuracy of determination of the reliability of magnetic data, the reliability determination module 92 derives an indicator vector G corresponding to gravitational acceleration using a plurality of acceleration data and derives, as the reliability index, a function of the angular difference between the direction of the derived indicator vector G and the direction of the eigenvector $l_3$, instead of directly using the direction of acceleration data which is 3D vector data to derive the reliability index.

The indicator vector G is a vector having x, y, and z components corresponding to the components $g_{ix}, g_{iy},$ and $g_{iz}$ of the acceleration data $g_i = (g_{ix}, g_{iy}, g_{iz})$ (i=1, 2, ...) which have been flattened by passing the acceleration data through an Infinite Impulse Response (IIR) filter or a Finite Impulse Response (FIR) filter. In the IIR filter, a plurality of sequentially input acceleration data are weighted and summed and a plurality of weighted sums are weighted and summed and the resulting value is then fed back. In the FIR filter, a plurality of sequentially input acceleration data are weighted and summed. If the moving object to which the navigation apparatus 1 is attached is an automobile, the cutoff frequency of the IIR filter and the FIR filter may be very small.

The inner product of the eigenvector $l_3$ and the indicator vector G is a function of the angular difference between the direction of the eigenvector $l_3$ and the direction of acceleration represented by the acceleration data. Therefore, the reliability determination module 92 derives a reliability index S expressed by the following Equation (6) and compares the reliability index S with a predetermined threshold p and determines that the reliability of the data set of statistical population is acceptable when the reliability index S is equal to or greater than the threshold p.

$$S = |l_3^T G| \tag{6}$$

When the reliability determination module 92 has determined that the reliability of the data set of statistical population is acceptable, the offset derivation module 94 derives a new offset based on the data set of statistical population (step S130).

The Inventor has suggested a method for deriving an offset of magnetic data based on a data set of statistical population including a plurality of magnetic data sequentially received from the magnetic sensor 2 (see Japanese Patent Application Publications Nos. 2007-240270, 2007-205944, 2007-139715, and 2007-107921). The method for deriving an offset from a data set of statistical population, the reliability of which has been determined to be acceptable, may or may not be a statistical method. The following is an example of the statistical method.

When the data set of statistical population includes 3 magnetic data that are not in the same line, a sphere on which the data set of statistical population is distributed is uniquely specified without using the statistical method. A position vector $c = (c_x, c_y, c_z)$ of the center of the sphere is obtained by solving simultaneous equations (7). Although the number of equality constraints is 4 for 3 variables, the equations (7) must have a solution since one of the 4 equality constraints is redundant.

$$\begin{bmatrix} (q_1 - \bar{q})^T \\ (q_2 - \bar{q})^T \\ (q_3 - \bar{q})^T \end{bmatrix} c = \frac{1}{2} \begin{bmatrix} q_1^T q_1 - R \\ q_2^T q_2 - R \\ q_3^T q_3 - R \end{bmatrix} \tag{7}$$

$$\text{where } R = \frac{1}{N} \sum_{i=1}^{N} q_i^T q_i. \tag{8}$$

Let us define j according to the following Equation (9) when the number of elements of the data set of statistical population is 4 or more.

$$j = \frac{1}{2} \begin{bmatrix} q_1^T q_1 - R \\ q_2^T q_2 - R \\ q_3^T q_3 - R \\ \vdots \\ q_N^T q_N - R \end{bmatrix} \tag{9}$$

Here, if simultaneous linear equations (10) for "c" have a solution, the solution is the center of the sphere on which the data set of statistical population is distributed.

$$Xc = j \tag{10}$$

However, when measurement errors of the magnetic sensor 2 are taken into consideration, the equation (10) cannot actually have a solution. Thus, let us introduce a vector "e" defined as in the following equation (11) in order to obtain a feasible solution using the statistical method.

$$e = Xc - j \tag{11}$$

The value of "c" which minimizes $\|e\|_2^2$ (i.e., $e^T e$) is likely to be the center of a sphere, to which the data set of statistical population is distributed nearest. When the matrix A is regular, the problem of obtaining the value of "c" which minimizes $\|e\|_2^2$ is an optimization problem of minimizing an objective function of the following Equation (12).

$$f(c) = (Xc - j)^T (Xc - j) \tag{12}$$

That is, the value of "c" which minimizes the objective function f(c) of Equation (12) is derived as a new offset. The value of "c" which minimizes the objective function f(c) can be written as the following Equation (13) when $X^T X$ is regular as assumed in this embodiment.

$$c = (X^T X)^{-1} X^T j \tag{13}$$

When the process of step S130 is completed, the procedure returns to the process of step S100 to repeat the processes described above. When it is determined that the reliability of the data set of statistical population is unacceptable, the data set of statistical population is discarded without deriving the new offset. The orientation derivation module 96 corrects the magnetic data using the new offset that is derived through the above procedure as needed to derive orientation data and outputs the orientation data to the navigation program 98.

5. Other Embodiments

Figure 5:
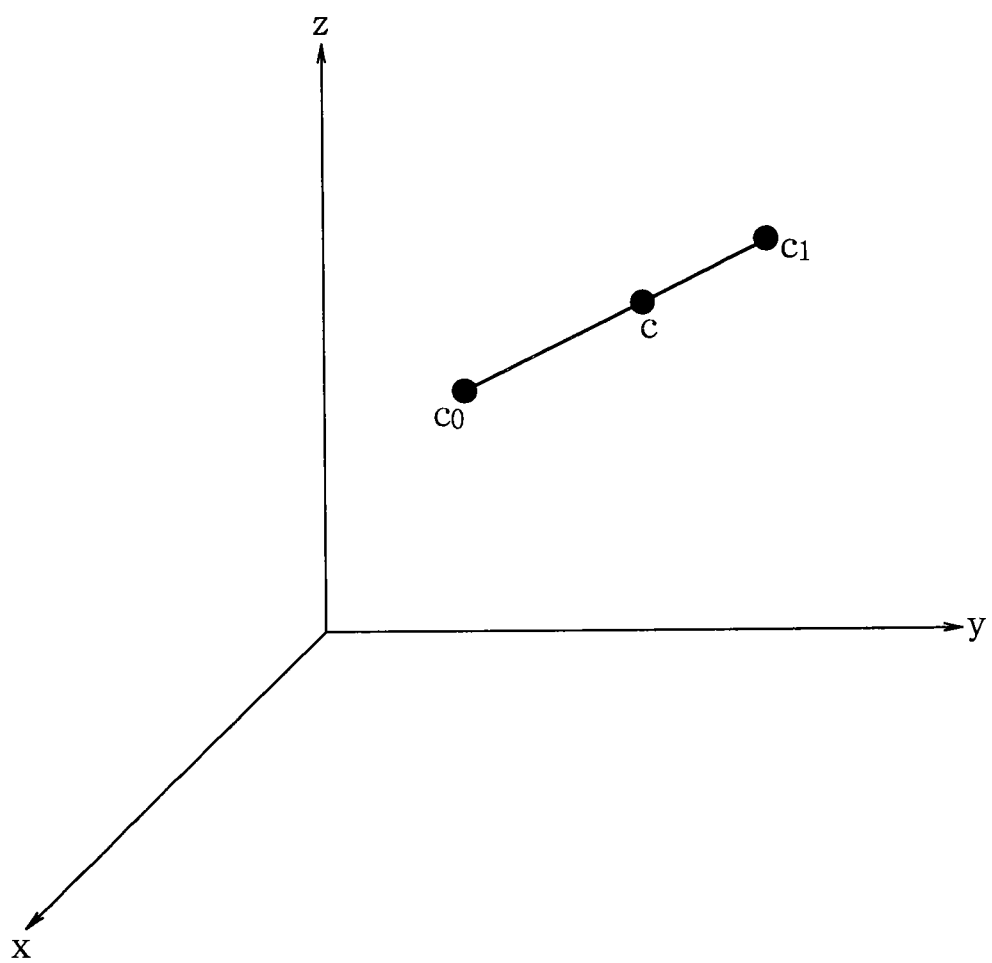
FIG. 5 is a vector diagram illustrating the embodiment of the invention.

Although magnetic data is not used to derive the offset when the reliability of the magnetic data is low or unacceptable in the above embodiment, i.e., when the reliability index S is small, the magnetic data may be used to derive the offset even when the reliability of the magnetic data is low. For example, a temporary offset $c_1$ derived based on a data set of statistical population, regardless of the magnitude of a reliability index S, may be weighted according to the reliability index S and a weighted average of the temporary offset $c_1$ and an old offset $c_0$ may be derived as a new offset c. Specifically, for example, when the new offset c is derived according to the following Equation (14), the new offset c is an internal point of division of the temporary offset $c_1$ and the old offset $c_0$ as shown in FIG. 5.

$$c = Sc_1 + (1 - S)c_0 \tag{14}$$

When the angular difference between the direction of a line perpendicular to an approximate plane representing a distribution of a data set of statistical population and the direction of acceleration represented by acceleration data is great, i.e., when the reliability of the data set of statistical population is low, the new offset approaches the old offset so that the offset is prevented from significantly varying based on the data set of statistical population whose reliability is low. When the angular difference between the direction of a line perpendicular to an approximate plane representing a distribution of a data set of statistical population and the direction of acceleration represented by acceleration data is small, i.e., when the reliability of the data set of statistical population is high, the new offset approaches the temporary offset so that the offset is accurately updated based on the data set of statistical population whose reliability is high.

The scope of the invention is not limited to the above embodiments and a variety of modifications can be made without departing from the scope of the invention. For example, although the navigation apparatus to which the invention is applied is exemplified by a Portable Navigation Device (PND), the invention may also be applied to a stationary navigation device or a pedestrian navigation device.

The invention claimed is:

1. A magnetic data processing method operable by a magnetic data processing device, the method comprising:

sequentially receiving magnetic data output from a 3D magnetic sensor of the magnetic data processing device, the magnetic data representing magnetic components along a plurality of axes;

storing, by the magnetic data processing device, a plurality of the magnetic data as a data set of statistical population;

sequentially receiving acceleration data output from a 3D acceleration sensor of the magnetic data processing device, the acceleration data indicating acceleration comprising static acceleration in a direction parallel to gravitation force and dynamic acceleration unique to the movement of the 3D acceleration sensor; and the magnetic data processing device deriving a first vector from the data set of the statistical population, the first vector indicating a direction of a line perpendicular to an approximate plane representing a distribution of the data set of the statistical population;

deriving a second vector by smoothing respective components of a plurality of the acceleration data sequentially received from the 3D acceleration sensor; and deriving a reliability index based on the first vector and the second vector for determining reliability of the data set of the statistical population.

2. A machine readable medium containing a magnetic data processing program which, when run on a computer will cause the computer to execute a process of:

sequentially receiving magnetic data output from a 3D magnetic sensor, the magnetic data representing magnetic components along a plurality of axes;

storing a plurality of the magnetic data as a data set of statistical population;

sequentially receiving acceleration data output from a 3D acceleration sensor, the acceleration data indicating acceleration comprising a static acceleration in a direction parallel to gravitation force and dynamic acceleration unique to the movement of the 3D acceleration sensor;

deriving a first vector from the data set of the statistical population, the first vector indicating a direction of a line perpendicular to an approximate plane representing a distribution of the data set of the statistical population;

deriving a second vector by smoothing respective components of a plurality of the acceleration data sequentially received from the 3D acceleration sensor; and deriving a reliability index based on the first vector and the second vector for determining a reliability of the data set of the statistical population.

3. A magnetic data processing device, comprising:

a 3D magnetic sensor for detecting magnetic components along a plurality of axes and outputting magnetic data representing the detected magnetic components;

a 3D acceleration sensor for outputting acceleration data indicating acceleration comprising static acceleration in a direction parallel to gravitation force and dynamic acceleration unique to the movement of the 3D acceleration sensor; and a processor connected to the 3D magnetic sensor and the 3D acceleration sensor through a bus, the processor being configured to:

sequentially input the magnetic data;

derive a first vector from a data set of statistical population composed of a plurality of the magnetic data output by the 3D magnetic sensor, the first vector indicating a direction of a line perpendicular to an approximate plane representing a distribution of the data set of the statistical population;

sequentially input the acceleration data;

derive a second vector by smoothing respective components of a plurality of the acceleration data sequentially input from the 3D acceleration sensor; and derive a reliability index based on the first vector and the second vector for determining a reliability of the data set of the statistical population.

4. The magnetic data processing device according to claim 3, wherein the processor is configured to derive the reliability index as a function of an angular difference between the direction of the first vector and a direction of the second vector that represents a direction of the acceleration.

5. The magnetic data processing device according to claim 3, wherein the processor is configured to derive an offset of the magnetic data using the data set of the statistical population according to the reliability index.

6. The magnetic data processing device according to claim 4, wherein the processor is configured to derive the second vector by weighing the acceleration data and summing the weighted acceleration data.

7. The magnetic data processing device according to claim 4, wherein the processor is configured to derive the reliability index as a function of an inner product of the second vector and an eigenvector corresponding to a minimum eigenvalue of a variance-covariance matrix of the data set of the statistical population.

8. The magnetic data processing device according to claim 5, wherein the processor is configured to derive the offset of the magnetic data using the data set of the statistical population only when the reliability index indicates that the data set is acceptable.

9. The magnetic data processing device according to claim 5, wherein the processor is configured to derive the offset of the magnetic data by using the data set of the statistical population while weighing the data set by a value of the reliability index.

10. A navigation apparatus, comprising:

a 3D magnetic sensor for detecting magnetic components along a plurality of axes and outputting magnetic data representing the detected magnetic components;

a 3D acceleration sensor for outputting acceleration data indicating acceleration comprising static acceleration in a direction parallel to gravitation force and dynamic acceleration unique to the movement of the 3D acceleration sensor; and a processor connected to the 3D magnetic sensor and the 3D acceleration sensor through a bus, the processor being configured to:

sequentially input the magnetic data;

derive a first vector from a data set of statistical population composed of a plurality of the magnetic data output by the 3D magnetic sensor, the first vector indicating a direction of a line perpendicular to an approximate plane representing a distribution of the data set of the statistical population;

sequentially input the acceleration data;

derive a second vector by smoothing respective components of a plurality of the acceleration data sequentially input from the 3D acceleration sensor;

derive a reliability index based on the first vector and the second vector for determining a reliability of the data set of the statistical population;

derive an offset of the magnet data using the data set of the statistical population according to the reliability index;

correct the magnetic data based on the offset; and provide notification of an orientation based on the corrected magnetic data.

* * * * *